March 26, 1940.   R. F. NICKERSON   2,194,835
RECOVERY OF PROTEIN FROM COTTONSEED
Filed Sept. 21, 1938
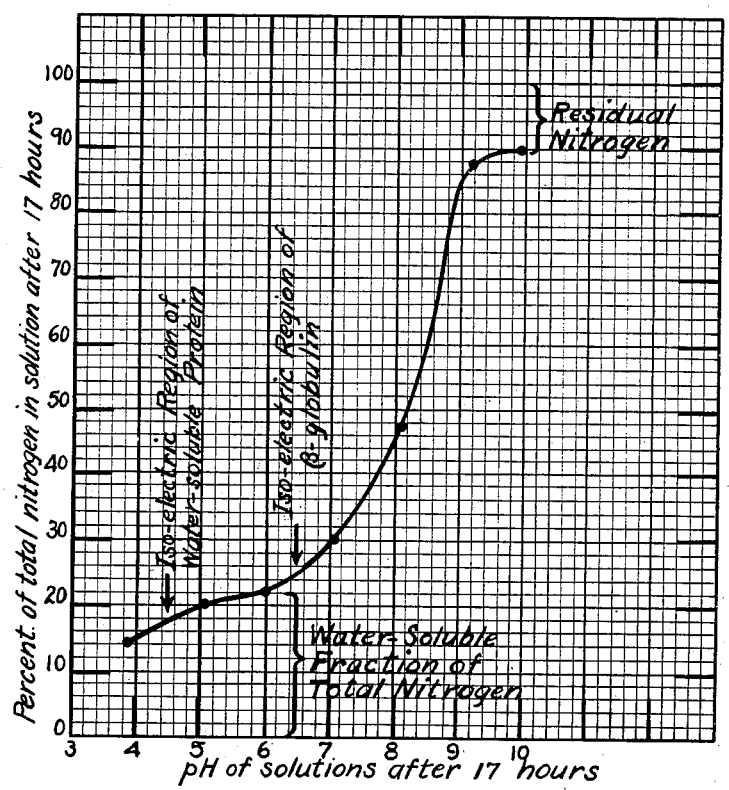
INVENTOR
Ralph F. Nickerson
by Christy and Wharton
Attorneys Patented Mar. 26, 1940

2,194,835

UNITED STATES PATENT OFFICE 2,194,835

RECOVERY OF PROTEIN FROM COTTONSEED

Ralph F. Nickerson, Pittsburgh, Pa., assignor to Cotton Research Foundation, a corporation of Tennessee Application September 21, 1938, Serial No. 230,993

2 Claims. (Cl. 260—112)

This invention relates to the recovery of protein from cottonseed and consists in procedure whereby protein may be recovered from this source in maximum quantity and in optimum condition.

The accompanying drawing is a chart indicative of solubility of cottonseed protein in water of varying condition with respect to acidity and alkalinity. It will be referred to in the ensuing specification.

In the past few years the proteins as a distinct species of chemical compound have received considerable industrial development and, as a result, promise to be important commercial raw materials of the future. The more commonly used proteins (casein, albumins, and gelatin) are derived from animal sources; but, for the enjoyment of these, industry must compete unfavorably with a demand for them as food-stuffs. Proteins of vegetable origin are, consequently, of great interest: they offer the industrial consumer an almost unlimited supply and the probability of a more stable price.

Among the vegetable sources of protein, cottonseed occupies a unique position. There is an enormous annual production which is guaranteed by the necessity for cotton lint. Cottonseed meats are extremely rich in protein. This invention concerns the recovery of industrially valuable protein from this rich and abundant source.

The presence in cottonseed meats of dyes or pigments is widely known. The most abundant and certainly the most frequently studied pigment is gossypol. Meats may contain other pigments besides gossypol, or the supposititious "other pigments" may simply be chemical derivatives of the extremely labile gossypol molecule.

The cottonseed meat is supposed to consist entirely of endosperm. When one of these seeds is sliced transversely into thin sheets with a sharp razor, the sections so obtained are very similar in macroscopic appearance to the cross-section of a tree-trunk. The concentric rings, which correspond to the tree's annual growth-rings, represent embryonic leaves overlying a hard, white central core. The embryonic leaves are white pulp heavily dotted with dark red spots (gossypol) which may be observed later on the stem and leaves of the growing plant.

If a thin cross-section of seed is placed on a glass plate and carefully treated with dilute alkali, the embryonic leaf structure changes color, from white to yellowish green. This suggests the presence of a separate pigment in the white pulp. Located in elemental leaf structure, this pigment may be a precursor of chlorophyll.

These pigments, whatever their chemical constitution, are a serious handicap in the separation of a first-quality industrial protein from cottonseed meats. Small fragments of hull material are almost bound to carry over in the flour produced from meats, and consequently the liability to discoloration from this source must constantly be kept in mind.

Gossypol is rapidly oxidized by air, especially in alkaline media, and becomes, thereby, an alkalisoluble substance. As an alkali-soluble compound it is chemically active, and appears to form a stable complex with the protein. The results of complex formation are a lessened solubility and the fixation of a dark brown color in the protein. Again, the tremendous surface presented to the solution by the protein as it precipitates makes adsorption of pigments a problem also. In any case it should be emphasized that the interference of pigments and methods of circumvention are of major importance in the procedure of preparing industrial proteins from cottonseed meats.

The crushing of cottonseed meats

The common practice in the preparation of cottonseed meats for the hydraulic pressing of oil consists of passing them between several pairs of closely set rolls and then giving them a high-temperature cooking treatment. This high-temperature processing destroys many of the desirable characteristics of the protein and causes a great deal of color fixation. The subsequent pressing operation leaves in the meal a substantial residue of oil (5-7 per cent), and this residue is such as to interfere with the protein extraction by inhibiting the penetration of aqueous solvents.

I have perceived that the practicable method of effecting a relatively complete separation of oil and gossypol from cottonseed meats, without danger from heat effects, is by solvent extraction. By this treatment the cottonseed oil content can readily be reduced to a negligible 1 per cent or less, and degradation due to heat alteration and color fixation can be avoided. I have investigated extensively solvent-extraction methods upon cottonseed meats prepared by the usual rolling methods and I have used on large scale a number of solvents, including acetone, ether, petroleum-ether acetone mixtures, and ethylene dichloride, but have generally failed to gain a yield of an entirely satisfactory meal from the standpoint of color. An investigation of the time elapsing between the rolling and the extraction revealed that considerable color fixation takes place when rolled kernels are permitted to stand either in air or in carbon dioxide. Even freshly rolled kernels show a strong tendency to color fixation, with the result that the extracted meal remains distinguishably yellow.

Subsequent experiments demonstrated that cracked kernels are superior to rolled kernels in affording, after extraction, a white, fat-free meal. A number of experiments on meals from whole cottonseed and from commercially dehulled meats were carried out, and showed that cracked or flaked meats, even after a few hours of exposure, did not tend to acquire a fixed yellow color. I discovered ethyl ether to be completely adequate as a solvent for the oil and the gossypol of meal that had been ground in an attrition mill. The grinding was easily effected with seeds of low moisture content (5-6 per cent). Low moisture is probably conducive also to most rapid action by solvents.

I was able to throw some light on the different behaviors of rolled and cracked kernels. Freshly cracked meal is white with strong reddish-brown tint, while rolled meats are of an even brass color. Crushed and kneaded with a mortar and pestle, cracked meal assumes the appearance of rolled meal. It appears, therefore, that the rolling or kneading of the kernels destroys the natural glandular structure of the seed, and brings the protein and pigments into direct contact. The pigments are spread over large surfaces, and are accordingly increasingly exposed to oxidation by air and to degradation by other seed constituents.

Cracking has other advantages over rolling. Hulls can be removed by screening the fragmented material before extraction. The removal of hulls is an extremely difficult matter in the case of rolled meats, for the meats are in sheet form with bits of hull firmly imbedded. In the cracked material the particles are discrete; in rolled material they are coherent.

I have found that finely divided meal yields its oil and gossypol most readily, and, after the solvent extraction, is better suited to the isolation of protein material than coarse meal. Eighty-mesh is an excellent degree of fineness, from the standpoint of protein extraction, to which this pulverization may be carried, but in practice I have found sixty-mesh to be a feasible and satisfactory limit. The speed and efficiency with which an organic solvent acts are conditioned largely by the penetrating power of the solvent and the size of the meal particles. Generally, the smallest meal particles are best suited to extraction.

Solvent extraction of raw cottonseed meal

Low-boiling petroleum fractions are frequently used to extract oils from vegetable products. The pigment, gossypol, is insoluble in petroleum ethers; but I have observed that there are a number of solvents that effect the extraction of both the oil and the gossypol simultaneously, and one of these, ethyl ether, I have used almost exclusively with cracked meal. Ethyl ether is the substance that is normally used in large-scale laboratory preparation; in industrial operation a non-inflammable solvent or a solvent of lower inflammability than the ether would be preferred. Other simultaneous solvents for cottonseed oil and gossypol are acetone, ethylene di-chloride, and acetone petroleum-ether mixtures.

Preparation of oil-free meal

The solvent-extracted meal, at the end of the extraction period, contains a large amount of solvent. If the meal is dried in air the solvent is lost and, in the case of ethyl ether or other highly volatile liquid, the meal becomes hydrated. The hydration effect is due to the cooling induced by rapid evaporation and a consequent precipitation of moisture from the air. For these reasons, the drying is best conducted in an evaporator.

Leaching of cottonseed flour

When the cottonseed meats have been ground to a fine meal and rendered oil-, gossypol- and hull-free, they contain about 60 percent of protein on a bone-dry basis. The residual 40 percent consists of sugar (raffinose) and interstitial cellulosic materials, including pentosans. Jones and Csonka have separated six distinct protein fractions from cottonseed flour, demonstrating the fact that the nitrogen of cottonseed is combined in proteins of more than a single species. Carefully prepared cottonseed flour is rich in enzymes, which probably constitute a very small fraction of the total protein content. Other small fractions of the nitrogen are associated with proteoses (split products of proteins) and with non-protein constituents such as betaine. Of the true proteins of cottonseed flour a small fraction is soluble in water; but by far the larger fraction is insoluble in water. It is the latter fraction of the protein content of cottonseed meats whose extraction and recovery constitute my invention.

I have determined the solubility of the nitrogenous constituents of cottonseed flour as a function of acidity and alkalinity, and have in Fig. 1 plotted the data. The pH values used as abscissae in this figure are chemical units of acidity or alkalinity. A pH value of 7 indicates a condition of neutrality, neither acid nor alkaline; it is the pH value of distilled water. Increasing acidity is represented by progressively greater downward deviations from pH 7; increasing alkalinity by progressively greater upward deviations from pH 7. The graph shows that at pH 6, a very faintly acid solution, about 20 per cent of the nitrogen of cottonseed flour is dissolved. This fraction is made up of the water-soluble proteins, the proteoses, and the non-protein nitrogenous constituents. The abrupt rise in solubility as alkalinity increases, i. e., as the pH values exceed 7, indicates the passage of globulin into solution.

In the precipitation (by acidification) of proteins from alkaline solutions, the precipitate forms a sticky, voluminous agglomerate that tends to tangle and occlude some of the above-mentioned water-soluble constituents. There is evidence also that, in alkaline solutions, the water-soluble and alkali-soluble types may interact and result in a mutual precipitation. I have discovered that these effects may to a large extent be minimized by leaching the cottonseed flour with water as a preliminary step, before proceeding to form of the larger mass an alkaline solution. In this leaching operation the water-soluble flour constituents are practically eliminated. A considerable portion of the residual pigments is removed also. I have found it advantageous to use about 0.2 percent of sodium bisulfite in the wash water, to retard oxidative changes in the flour.

Any good antioxidant may be employed to protect the aqueous suspension of flour, provided that it does not subsequently yield a contaminant. Sodium hydrosulfite exerts the proper action, but care must be exercised in its use, because it tends to yield free sulfur. The amount of leach water may vary upwards from 10 parts to one part of flour. I have found that by heating the suspension to 55-60° C. for a few minutes the efficiency of the leaching operation is greatly increased, and, at the same time, some of the minor protein constituents are coagulated.

Alkaline digestion and extraction

I recover by a centrifugal process the washed flour as a wet cake, and I redisperse it in water containing 0.3 to 0.5 percent of sodium sulfite, sodium hydrosulfite, or equivalent antioxidant in proper quantity. I introduce dilute sodium hydroxide into the flour-water-sulfite mixture, and at the same time stir the suspension vigorously to prevent local concentration effects. The sodium hydroxide is so added in quantities sufficient to bring the pH value of the mixture to 10. Under these conditions the sodium sulfite or other antioxidant protects the protein from oxidation but (of greater ultimate significance) it also prevents the oxidation of any residual pigments from a yellow inactive form to an active reddish-brown form. The reddish-brown form is capable of some sort of chemical combination with the protein which, in turn, acquires a permanent salmon tint.

It happened that, just after I had completed my studies of the beneficial effects of antioxidant, the use of sulfite to prevent oxidation of protein was reported by others, working on another vegetable protein. In the case of cottonseed flour, however, the protection the antioxidant gives to the protein is, as I have reason to think, of far less importance than the inhibition that it exerts upon the pigment residues, an effect that could not have been anticipated, even from such a revelation as that just indicated.

The beneficial effects of sodium sulfite during the alkaline digestion of cottonseed meal prior to the extraction of protein suggested that a measurement of the oxidation potential of a suspension of meal might indicate the conditions under which deterioration occurs. Measurements were made on an aqueous extract of raw meal and on an alkaline (1 percent sodium carbonate) extract of identical meal. The extracts were protected from air throughout the experiment with a layer of petroleum ether.

The values I found for redox potential, rH, cannot be defined in absolute terms; in unknown solutions they are a qualitative measure of oxidizing power of the solutes. I observed, however, that the sulfites, for example, have a lower redox potential at lower pH values by virtue of the increased hydrogen ion concentration and a less stable structure. It appears, therefore, that, from pH values ranging from 6 to 10 cottonseed meal constituents produce a higher redox potential than does the sulfite; and, consequently, the sulfite is capable of acting as an antioxidant. The difference is small, however, and the reducing action is correspondingly mild. This is not a disadvantage with an easily altered substance such as a protein.

The practical significance of these results is particularly apparent during centrifugal operations in which the meal-water-alkali suspensions are atomized into the open chamber and thereby subjected to intimate contact with large amounts of atmospheric oxygen. If sulfite or other antioxidant absorbs the oxidizing effects, the pigments do not become activated.

In place of sodium hydroxide, almost any alkaline salt may be used in effecting alkaline digestion. Among these are sodium carbonate, trisodium phosphate, borax, and other salts of strong bases and weak acids. Nevertheless, the hydroxides of the alkali metals have two distinct advantages over alkaline salts. First, a smaller amount of hydroxide produces the necessary pH value; second, the salts tend to retain protein in solution, especially at concentrations exceeding one percent. With caustic, inorganic salts also are formed, but only in small amounts, since the concentration of caustic employed is usually of the order of $\frac{1}{10}$ of one percent and the corresponding salt effect is minimized.

The amount of aqueous-digestion liquor per unit weight of flour may be varied within wide limits. With less than 10 weights of solution per weight of flour, too large a proportion of the protein solution is retained by the wet meal residue and the yield of protein is decreased. Large volumes of solution increase yield but necessitate larger capacity machines for the various operations.

The digestion of the flour-water-sulfite-alkali mixture at pH 10 may be carried out at any temperature below 60° C. The digestion time corresponding to maximum yield of protein is conditioned largely by the mesh-size of the original flour. My experiments have shown that optimum yields are obtained with digestion times of 30 minutes for 80-mesh flour, 60 minutes for 60-mesh flour, and 120 minutes for 40-mesh flour. Owing to untoward effects of prolonged digestion on the protein, it is desirable to start with as fine a flour as possible and thus to reduce the digestion period. It is necessary to readjust the pH to 10 during and at the end of the digestion period, unless a buffer salt be employed. With proper attention, however, the use of buffer salts is unnecessary.

At the end of the digestion period most of the protein will have passed into the alkaline solution. The alkaline solution may then be separated from the flour residue by centrifugation.

Experiments with a number of different alkalies have shown that ions of the strong alkali metals, sodium and potassium, are superior to ammonia and ions of the alkaline earth metals as protein extractants. Ammonia gives low yields, while calcium and magnesium tend to make the protein entirely insoluble.

Centrifugal processes

Centrifugation is the only convenient method now available for effecting the separation of liquids from non-filterable precipitates. Hydrated cottonseed flour, flour residues, and the protein itself are essentially non-filterable and can be manipulated readily through the agency of the centrifuge.

Precipitation of the protein

The clear alkaline extract of cottonseed precipitates its protein almost completely upon the addition of acids. Over-acidification brings about a denaturation of the product, and consequently only enough acid to effect a clean precipitation should be employed. I have found that good precipitation is produced by acidification of the alkaline extract to pH 5.5-6.0 (see Fig. 1).

The manner in which acid is added to the alkaline extract has considerable bearing upon the resulting precipitation. If the acid be introduced slowly into the vigorously stirred solution, the precipitate will be fine-grained and less likely to trap undesired material. If local effects of acid concentration arise as a result of poor stirring, a few large curds form, but the supernatant liquid tends to remain milky because of the suspension in it of fine protein particles.

I have employed hydrochloric, acetic, and sulfuric acids as precipitating agents, and, while all are serviceable, I have found that sulfuric acid gives the most rapid and complete precipitation.

*Final washing and drying of protein*

The protein precipitate, as described above, may be separated from its supernatant liquid by centrifugation. The cake deposited in the centrifuge is relatively firm, but it contains about 80 percent of water. It has adsorbed on it also those residual pigments that dissolve in alkali and precipitate in neutral or weakly acid solutions. I have found that these pigments can be removed by mixing the protein cake thoroughly with 5 weights of ice-cold 70 percent acetone. This procedure brings about a partial dehydration of the cake also. The protein-acetone mixture is quite filterable and may be separated quickly in this way. Acetone in higher concentrations and at room temperature is capable of denaturing proteins but 70 percent acetone at 10° C. for 1 hour has no visible effect on the protein material derived from cottonseed.

The acetone-washed protein dries rapidly in a current of air. Drying is accomplished most readily if the washed protein cake is drawn out into thin sheets or rods. Rapid drying is one means of preventing putrefaction; and, for large-scale processing, I recommend vacuum drying.

The quality of the protein is considerably improved if the alkaline extract be diluted to 25 or 30 times the original weight of the flour before the final precipitation is undertaken or if the protein is washed with water. In this alternate procedure, a large proportion of the supernatant water is removed by siphoning, and the protein is recovered by a centrifugal process. Under these conditions, a final washing of the protein with acetone is unnecessary. A volume of 25 or 30, based on the original weight of flour, can be reached efficiently by repeated extractions of the flour with aqueous alkali.

*Physical properties of cottonseed proteins*

The iso-electric point of cottonseed $\beta$-globulin, as the recovered protein may be called, is uncommonly high. The iso-electric point of a protein might be defined as the region of minimum properties. In aqueous solutions proteins act both as acids and as bases: they combine with alkali to form soluble salts, and they combine with strong acids to form soluble complexes. There is an intermediate point in the acid-base relationship at which proteins exhibit no tendency to combine and consequently precipitate. Thus, the iso-electric point corresponds to minimum solubility. Similarly, it corresponds to minimum swelling and minimum viscosity. For most proteins this neutral point or minimum point lies within the range of slight acidity, in the pH range 4 to 5. In fact, the iso-electric point of the water-soluble protein of cottonseed is approximately at pH 4.5 and may be recognized in an abrupt down-trend in the solubility curve (Fig. 1). On the other hand, the most remarkable property of the principal protein fraction of cottonseed, the $\beta$-globulin, is its high iso-electric point, which appears to lie between pH values 6.3 and 6.8. For all practical purposes this value corresponds to that of distilled water; and the significance is that, unlike most proteins, $\beta$-globulin exhibits its minimum behavior in pure water. The importance of this difference from other proteins is immediately apparent in the fact that $\beta$-globulin shows no tendency to swell or dissolve in water. This property indicates peculiar suitability of the protein under consideration for particular uses, such as in the production of water-proof glues and in the preparation of water-resistant textile and paper sizes and finishes. In the field of synthetic protein fibers this property is of yet greater potential significance.

In the carrying out of the process as described above it will be observed that the water-soluble proteins present in the starting material (cottonseed meal) are in the main extracted and rejected. The protein material that I recover is an alkaline-extracted protein or protein association that, as I find to be the case, is a substance of minimum solubility in distilled water; that is to say the iso-electric point is substantially that of distilled water. The range in pH value of the iso-elecric point I believe to be 6-7. On this account my end product is a protein or protein association that possesses high industrial value.

*Summary*

The procedure that I have followed most successfully from the standpoint of utility and quality of product will be reviewed in brief.

Dehulled cottonseed meats are cracked or flaked to 1/60 inch fragments and thoroughly extracted with ether (or other suitable solvent). The resulting flour should have 1 percent or less of oil and only a fraction of its original pigments.

The fine, dry flour from the above operation is well suited to the extraction of protein. The flour is treated with 10 or more weights of water containing 0.2 per cent of sodium sulfite, sodium bi-sulfite, or other antioxidant, which has already been adjusted to pH 6.4. The suspension of cottonseed flour is heated to 55-60° C., allowed to leach with frequent stirring for an hour, and then is centrifuged. Judicious amounts of octyl alcohol or some other anti-foaming agent are useful in combatting the froth which the operation of the centrifuge is prone to create.

The firm cake of washed flour is removed from the centrifuge and redispersed in 15 weights of 0.4 percent of sodium sulfite or other antioxidant. Sodium hydroxide is introduced into the vigorously stirred suspension until the pH of the medium reaches 10. The digestion is allowed to proceed at room temperature for an hour. It is advisable to agitate the suspension gently throughout the digestion period and to readjust the pH to 10 midway of the digestion and finally at the end.

The alkaline solution of protein is then separated from the flour residue by centrifugation. Again, the use of small amounts of octyl alcohol is to be recommended. The completeness of the separation of alkali-insoluble solids from the protein solution determines to a considerable extent the quality of the final product, and, consequently, a clarification by high-speed centrifugation may be desirable.

The clear alkaline protein solution is adjusted to pH 5.8 with sulfuric acid and at the same time vigorously stirred. The β-globulin which precipitates may be recovered by sedimentation or preferably by centrifugation. The firm cake produced by the latter process is redispersed in 5 weights of ice-cold 70 percent acetone and filtered or simply washed with water and centrifuged. The washed protein is dried as rapidly as conditions permit. This method has been proved to be adequate for large-scale work.

I claim as my invention:

1. The method herein described of recovering protein from cottonseed which consists in fragmenting cottonseed meats, separating by solvent extraction oil and gossypol from the fragmented material, drying the residue, leaching the fragmented oil and gossypol free material with water in so doing removing the water-soluble protein, redispersing the leached material in water, adding to the dispersion alkali and in so doing effecting solution of the non-watersoluble protein, separating the liquid from the undissolved solids, and precipitating the protein from solution.

2. The method herein described of recovering protein from cottonseed which consists in fragmenting cottonseed meats to discrete fragments of the order of one sixtieth of an inch in diameter, separating by solvent extraction oil and gossypol from the fragmented material, drying the residue, leaching the finely fragmented material with water that carries in solution an antioxidant, redispersing the leached material in water, adding to the dispersion alkali and in so doing effecting solution of protein, separating the liquid from the undissolved solids, and precipitating protein from the liquid.

RALPH F. NICKERSON.